US009473598B2

(12) United States Patent
Kashyap

(10) Patent No.: US 9,473,598 B2
(45) Date of Patent: Oct. 18, 2016

(54) NETWORK CONNECTION FAILOVER DURING APPLICATION SERVICE INTERRUPTION

(75) Inventor: Vivek Kashyap, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 1121 days.

(21) Appl. No.: 11/958,428

(22) Filed: Dec. 18, 2007

(65) Prior Publication Data

US 2009/0157882 A1  Jun. 18, 2009

(51) Int. Cl.
| | |
|---|---|
| *G06F 15/16* | (2006.01) |
| *H04L 29/06* | (2006.01) |
| *H04L 29/08* | (2006.01) |
| *H04L 29/14* | (2006.01) |

(52) U.S. Cl.
CPC ........... *H04L 69/16* (2013.01); *H04L 67/1002* (2013.01); *H04L 67/1034* (2013.01); *H04L 67/14* (2013.01); *H04L 69/162* (2013.01); *H04L 69/163* (2013.01); *H04L 69/40* (2013.01); *G06F 15/16* (2013.01)

(58) Field of Classification Search
CPC ... G06F 15/16; H04L 67/1034; H04L 67/14; H04L 67/1002; H04L 69/16; H04L 69/40; H04L 69/162; H04L 69/163
USPC .................................. 709/227, 224, 220, 237
See application file for complete search history.

(56) References Cited

U.S. PATENT DOCUMENTS

| | | | | |
|---|---|---|---|---|
| 5,727,142 | A | * | 3/1998 | Chen ................................. 714/2 |
| 5,802,258 | A | * | 9/1998 | Chen ................................ 714/10 |
| 5,828,569 | A | * | 10/1998 | Fisher ............................. 700/82 |
| 6,006,259 | A | | 12/1999 | Adelman et al. |
| 6,021,507 | A | * | 2/2000 | Chen ................................. 714/2 |
| 6,360,262 | B1 | * | 3/2002 | Guenthner et al. ........... 709/226 |
| 6,665,304 | B2 | | 12/2003 | Beck et al. |
| 6,711,178 | B1 | * | 3/2004 | O'Gorman .............. H04L 12/24 370/393 |
| 6,711,621 | B1 | * | 3/2004 | Mitra ..................... H04L 69/16 370/401 |
| 6,853,617 | B2 | * | 2/2005 | Watson et al. ................ 370/218 |
| 6,871,296 | B2 | | 3/2005 | Kashyap |
| 6,880,013 | B2 | | 4/2005 | Kashyap |

(Continued)

FOREIGN PATENT DOCUMENTS

WO    WO2006010812    2/2006

OTHER PUBLICATIONS

Kuntz et al., MIGSOCK Migratable TCP Socket in Linux, Feb. 21, 2002, 27 pages.

(Continued)

*Primary Examiner* — Krista Zele
*Assistant Examiner* — Anthony Fabbri
(74) *Attorney, Agent, or Firm* — Walter W. Duft

(57) ABSTRACT

A system, method and computer program product for implementing network connection failover during application service interruption. While the application is quiesced, a network socket that terminates a network connection to a network peer is maintained on behalf of the application. The socket's network connection state information is sustained by providing acknowledgements of incoming network traffic to the network peer that prevent the peer from terminating the connection. Upon restart, the application is brought up with a blocked socket. The state of the blocked socket is conformed to a current network connection state of the original socket and the blocked socket is unblocked.

25 Claims, 13 Drawing Sheets

(56) References Cited

U.S. PATENT DOCUMENTS

| | | | |
|---|---|---|---|
| 6,920,501 B2* | 7/2005 | Chu et al. | 709/228 |
| 6,934,875 B2* | 8/2005 | Kashyap | 714/4 |
| 6,938,092 B2 | 8/2005 | Burns | |
| 6,938,179 B2* | 8/2005 | Iyer et al. | 714/4.4 |
| 6,973,517 B1* | 12/2005 | Golden et al. | G06F 15/16 710/104 |
| 7,016,973 B1 | 3/2006 | Sibal et al. | |
| 7,039,718 B2 | 5/2006 | Vertes | |
| 7,076,555 B1 | 7/2006 | Orman et al. | |
| 7,275,106 B1* | 9/2007 | Bean et al. | 709/227 |
| 7,689,702 B1* | 3/2010 | Tripathi | G06F 9/5027 370/389 |
| 8,484,370 B1 | 7/2013 | Coffee et al. | 709/232 |
| 8,549,345 B1* | 10/2013 | Tripathi | H04L 69/16 714/4.1 |
| 2001/0056505 A1* | 12/2001 | Alibakhsh | H04L 67/42 719/310 |
| 2005/0149529 A1* | 7/2005 | Gutmans | 707/10 |
| 2005/0251785 A1 | 11/2005 | Vertes et al. | |
| 2005/0262411 A1* | 11/2005 | Vertes et al. | G06F 11/203 714/741 |
| 2006/0034290 A1* | 2/2006 | Kalofonos et al. | 370/395.2 |
| 2006/0075119 A1* | 4/2006 | Hussain et al. | 709/227 |
| 2006/0168334 A1* | 7/2006 | Potti et al. | 709/239 |
| 2006/0280175 A1* | 12/2006 | Kanakasapapathi | H04L 12/4633 370/389 |
| 2006/0294317 A1* | 12/2006 | Berke | G06F 15/16 711/141 |
| 2007/0005827 A1* | 1/2007 | Sarangam | H04L 67/1002 710/46 |
| 2007/0097979 A1* | 5/2007 | V. | G06F 15/16 370/392 |
| 2009/0064207 A1* | 3/2009 | Sigal | 719/330 |

OTHER PUBLICATIONS

Almesberger, TCP Connection Passing, OLS 2004, 2004, pp. 9-22.

* cited by examiner

NETWORK CONNECTION FAILOVER DURING APPLICATION SERVICE INTERRUPTION

BACKGROUND OF THE INVENTION

1. Field of the Invention

The present invention relates to the management of connections between end points in a network. More particularly, the invention is directed to maintaining a network connection when one network end point experiences a planned service interruption, such as during transfer of an application that implements the end point from one network system to another as part of a software migration operation.

2. Description of the Prior Art

By way of background, it is sometimes necessary to temporarily disable a software application while the application is engaged in network communication at one endpoint of a network connection. By way of example, such an interruption could occur when the application is migrated from one network system to another for load balancing or other reasons. During the period of interruption, it may be desirable to maintain the application's network connection even though the application is unable to process network data. This would be the case, for example, if the application was involved in a complex transaction with a network peer and the transaction state would be lost if the network connection was terminated.

Techniques have been proposed whereby a live TCP (Transmission Control Protocol) or UDP (User Datagram Protocol) connection can be passed from one machine to another without connection loss. Such techniques have included solutions such as (1) offloading the application's network protocol processing to a front end communication entity, (2) having a takeover node continuously snoop the connection and thereby mirror the application's network protocol processing, (3) isolating the network connection so that no packets are received or sent, (4) placing the network peer in a persist mode and having a remote home agent assume responsibility for the connection, or (5) modifying the TCP protocol at both network connection endpoints to support temporary connection inactivity. The first two solutions have the disadvantage of requiring duplicative processing resources to monitor the network connection. The third solution runs the risk that the network peer will drop the connection if the interruption takes longer than the peer's view of retransmission time and the number of transmissions that are allowed before the connection is terminated. The fourth solution requires a separate machine to assume connection responsibility. The fifth solution requires modification to the network stacks of both endpoints.

It would be desirable to provide an alternative technique whereby an application's network connection can be maintained during a temporary cessation of application processing activity. What is particularly needed is a solution that accomplishes the foregoing without the attendant disadvantages noted above.

SUMMARY OF THE INVENTION

The foregoing problems are solved and an advance in the art is obtained by a system, method and computer program product for implementing network connection failover during application service interruption. While the application is quiesced, a network socket that terminates a network connection to a network peer is maintained on behalf of the application. The network connection is sustained by providing acknowledgements of incoming network traffic to the network peer that prevent the peer from terminating the connection. Upon restart, the application is brought up with a blocked socket. The state of the blocked socket is conformed to a current network connection state of the original socket and the socket is unblocked.

According to exemplary disclosed embodiments, the application may be disposed in a virtual application environment and the service interruption may be due to the application being quiesced as part of an application migration operation wherein the virtual application environment is migrated from a source machine to a target machine. In this environment, the source socket may be maintained by a connection manager that resides on the target machine. Alternatively, there could be two connection managers. One connection manager could be a source connection manager residing on the source machine, or an intermediary machine. The other connection manager could be a target network connection manager on the target machine. The target connection manager may be used to conform the state of the blocked socket to the current network connection state of the original socket that is maintained by the source connection manager, and unblock the blocked socket. The virtual application may or may not include an operating system that contains the network socket. If it does, the source connection manager may be distributed between a first source connection manager part residing in the virtual application environment on the source machine and a second source connection manager part residing outside the virtual application environment, and further wherein the target connection manager resides in the virtual application environment on the target machine. During the period that the application is out of service, the network connection may be sustained by the transport layer of the network protocol stack associated with the original socket maintained by the source connection manager. The network connection may be sustained in part by reducing a window size associated with the connection manager socket in accordance with data received from the network peer. Eventually, the network peer may enter a "persist" state. This state (along with other transport layer states) can be easily sustained by acknowledging future packets sent by the peer. The network connection state information used to conform the blocked socket may include one or more of 4-tuple source and destination addresses, port numbers, TCP flags, Selective ACKnowledgement (SACK) options data, an Initial Send Sequence number (ISS), current sequence and acknowledgement numbers, a current state of a receive buffer and transmitted but unacknowledged data.

BRIEF DESCRIPTION OF THE DRAWINGS

The foregoing and other features and advantages of the invention will be apparent from the following more particular description of preferred embodiments of the invention, as illustrated in the accompanying Drawings, in which.

DETAILED DESCRIPTION OF THE PREFERRED EMBODIMENTS

Figure 1:
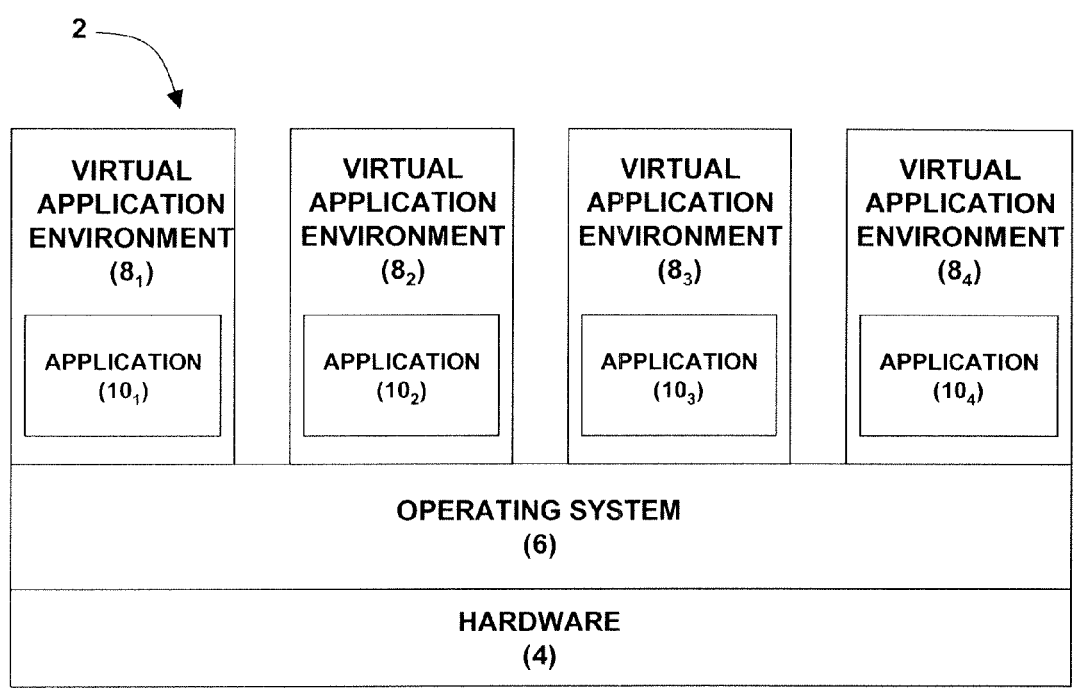
FIG. 1 is a functional block diagram showing a data processing system supporting virtual application environments.

The invention will now be described by way of exemplary embodiments shown by the drawing figures, in which like reference numerals indicate like elements in all of the several views.

Turning to FIG. 1, a data processing system 2 that may be used to implement network connection failover in accordance with the present disclosure includes a hardware platform 4 and an operating system 6 that manage resources provided by the hardware platform on behalf of one or more application programs (applications). The operating system 6 is assumed for purposes of illustration only, and not by way of limitation, to provide virtual application environments $8_1$, $8_2$, $8_3$ and $8_4$ that in turn support respective applications $10_1$, $10_2$, $10_3$ and $10_4$. Each application $10_1$, $10_2$, $10_3$ and $10_4$ may comprise one or more application processes, threads or other execution contexts. As will be seen below in connection with FIG. 8, operating systems that do not support virtual application environments may also be used to implement network connection failover in accordance with the present disclosure.

The hardware platform 4 may be implemented using any known data processing equipment that is capable of supporting execution of the operating system 6, including the exemplary data processing hardware described below in connection with FIG. 9. The operating system 6 may be implemented using any conventional operating system software capable of optionally supporting the virtual application environments $8_1$, $8_2$, $8_3$ and $8_4$, with appropriate modifications being made thereto to provide network connection failover as disclosed herein. This type of virtualization is known as operating system-level virtualization. In operating system-level virtualization, virtual application environments are sometimes referred to as "containers." As will be seen in the discussion of FIG. 8 below, an alternative form of virtualization may also be used in which multiple operating systems (which do not require support for application containers) run on a virtual machine monitor or "hypervisor."

Examples of operating systems that have application container support capability include the IBM® AIX® 6 operating system with WPAR (Workload PARtition) support, IBM® Meiosys virtualization products, and Linux® operating system kernels built in accordance with the OpenVZ project, the VServer project, or the Free VPS project. These operating systems have the ability to selectively allocate physical and logical resources to their containers (virtual application environments). Such resource allocations may include CPU time, memory, I/O (Input/Output) ports, network devices, disk partitions, etc. Depending on the particular virtualization implementation being used, each virtual application environment may have its own process tree, file system directory tree, users and groups, system libraries, network addresses, disk space, etc. Thus, residing within the container are all of the application's core executable and binary code files, representing everything needed by the application to operate. Only nonessentials, such as configuration settings and user data, are maintained outside the container. The system resources, file system and networking are virtualized. To the applications within the containers, and to users of the applications, each container appears like an independent operating system instance i.e. as a virtual machine. The applications and users within a container cannot "see" outside the container. Typically there is also a container used by a privileged "root" user that can view the contents of all the other containers. This is sometimes referred to as the "global" container or context. Note that the reference to the above-named technologies is not intended to suggest that the network connection failover techniques disclosed herein are limited to particular product offerings.

With respect to the applications $10_1$, $10_2$, $10_3$ and $10_4$, it should be understood that the term "application" as used herein refers to the performance of a particular function and rather than to signify separate software that is distinct from an operating system. Although an application will in many cases be a distinct software program, in other cases an application may consist of little or no code that could be considered separate from the operating system itself. For example, if one of the virtual application environments $8_1$, $8_2$, $8_3$ and $8_4$ is configured as a firewall appliance, almost all of the processing will take place in kernel mode.

The system 2 provides an environment in which each of the applications $10_1$, $10_2$, $10_3$ and $10_4$ and their workloads can be readily transferred from one point of use to another. This is particularly advantageous for server systems wherein workloads need to be balanced between multiple servers. The virtual application environments $8_1$, $8_2$, $8_3$ and $8_4$ make this possible by acting as mediators between the applications $10_1$, $10_2$, $10_3$ and $10_4$ and the underlying operating system 6. Whereas it is not normally possible to transfer a live application without losing its state, this can be done in an operating system-level virtualization environment by migrating the virtual application environments $8_1$, $8_2$, $8_3$ and $8_4$ that "contain" the applications $10_1$, $10_2$, $10_3$ and $10_4$. This type of migration involves a conventional technique known as "checkpointing" and is handled by conventional migration management logic. As is well known to persons skilled in the art, checkpointing entails capturing an application's running state and memory footprint and saving it to disk so that it can be recovered later using an operation known as a "restart." Application migration entails checkpointing an application on a source system and restarting the application on a target system. Virtual application environments facilitate the migration process by eliminating application dependencies in such areas as mail settings, network addresses, libraries, and the like, such that the "containerized" applications are not aware that they are being hosted by a different system.

Figure 2:
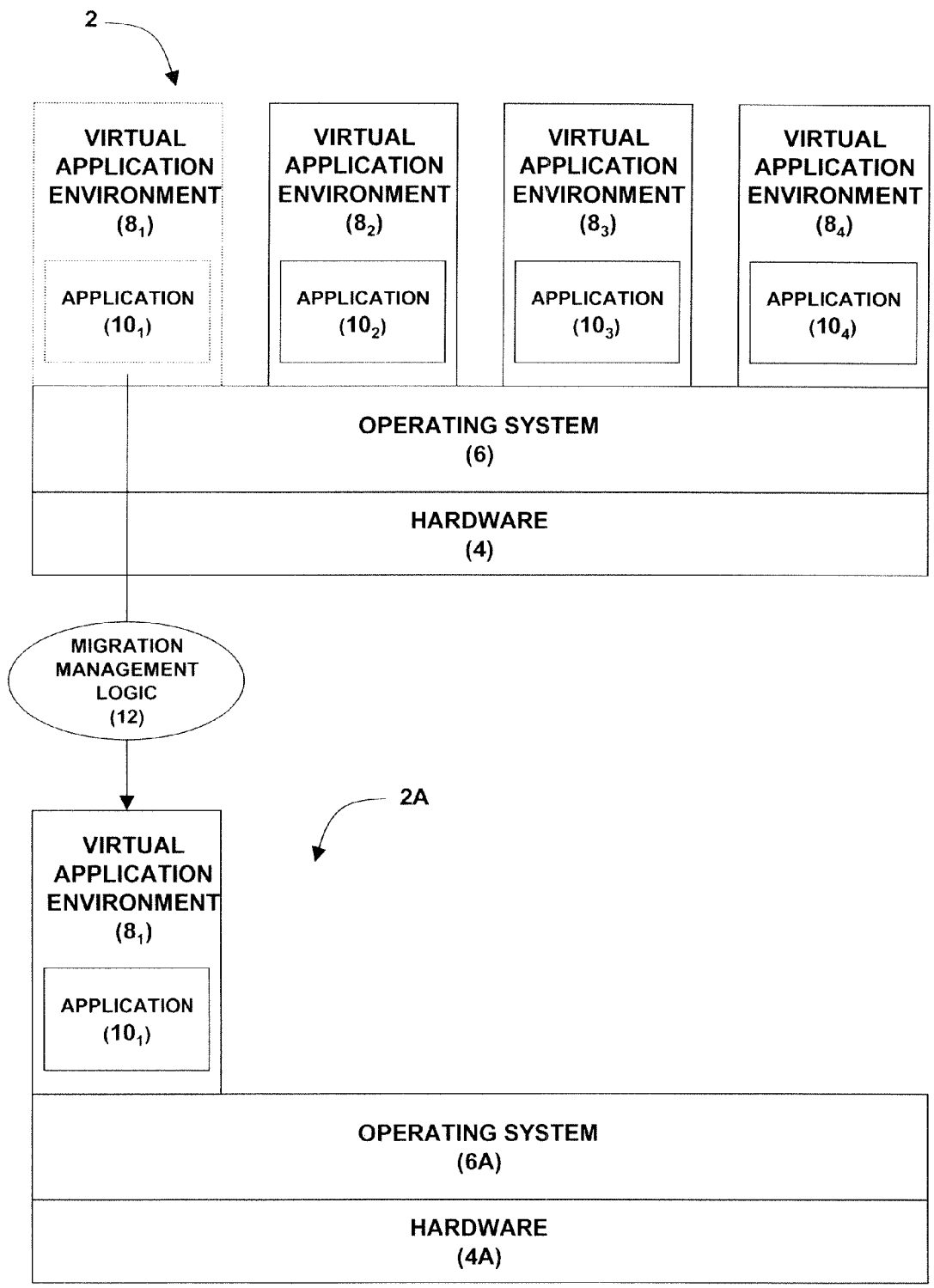
FIG. 2 is a functional block diagram showing the migration of a virtual application environment from the data processing system of FIG. 1 to a different data processing system.

FIG. 2 illustrates one example of virtual application environment migration in which the migration is between separate hardware platforms. In particular, the virtual application environment $8_1$ has been transferred from the data processing system 2 (representing a source machine) to a different data processing system 2A (representing a target machine) comprising a hardware platform 4A running an operating system 6A. The migration management logic that implements the migration can be implemented in a variety of ways. For example, it could reside in an operating system as a kernel module, or in the user space associated with a global container, or as a combination of kernel and user space functionality. The migration management logic could reside on the source data processing system 2, on the target data processing system 2A, on both systems as distributed logic, or even on a third data processing system (not shown). Furthermore, one portion of the migration management logic might just checkpoint an application and a different entity (user space or kernel) representing another portion of the migration management logic might restart the application from the checkpointed state file. In FIG. 2, the migration management logic is illustrated by reference numeral 12. It is to be understood that this logic could be illustrated in any of the various ways described above, or in any other way that allows application migration to be successfully implemented.

Unfortunately, using conventional virtual application environment migration techniques to perform the foregoing migration raises the problem of network connection failover discussed by way of background above. As such, a mechanism is needed to prevent network connections from being dropped during the period in which an application within a migrating virtual application environment is not able to process network communications because the application is temporarily out of service. The problem is that the remote network peer may reset the connection if the failover takes too much time. This could be the case if the remote system has short "keepalive" or retransmission timeouts. This issue may be exacerbated if the application restart on target machine takes time. Such delay could be due to a need to suspend the workload on the target, the handling of operating system upgrades or more important jobs, or a large number of connections having to be resurrected as part of the transfer.

This problem can be solved by a "connection manager," described in more detail below, that acts as a temporary intermediary between the migrating application and a network peer that is communicating with the application via a network connection. During application migration, the connection manager keeps the network connection alive by assuming control of the network socket owned by the application and representing the application's network connection endpoint, thereby keeping the socket alive and allowing the transport protocol (e.g., TCP) layer of the underlying network stack to continue to manage the network connection. In a connection oriented windowing protocol such as TCP, incoming data is accepted (and buffered) while the transport layer simultaneously closes the window as per the data. Eventually (in the case of TCP), the remote client may enter a 'persist' state. This state (along with other TCP states) is easily sustained by virtue of the transport layer logic acknowledging future packets sent by the network peer.

Figure 3:
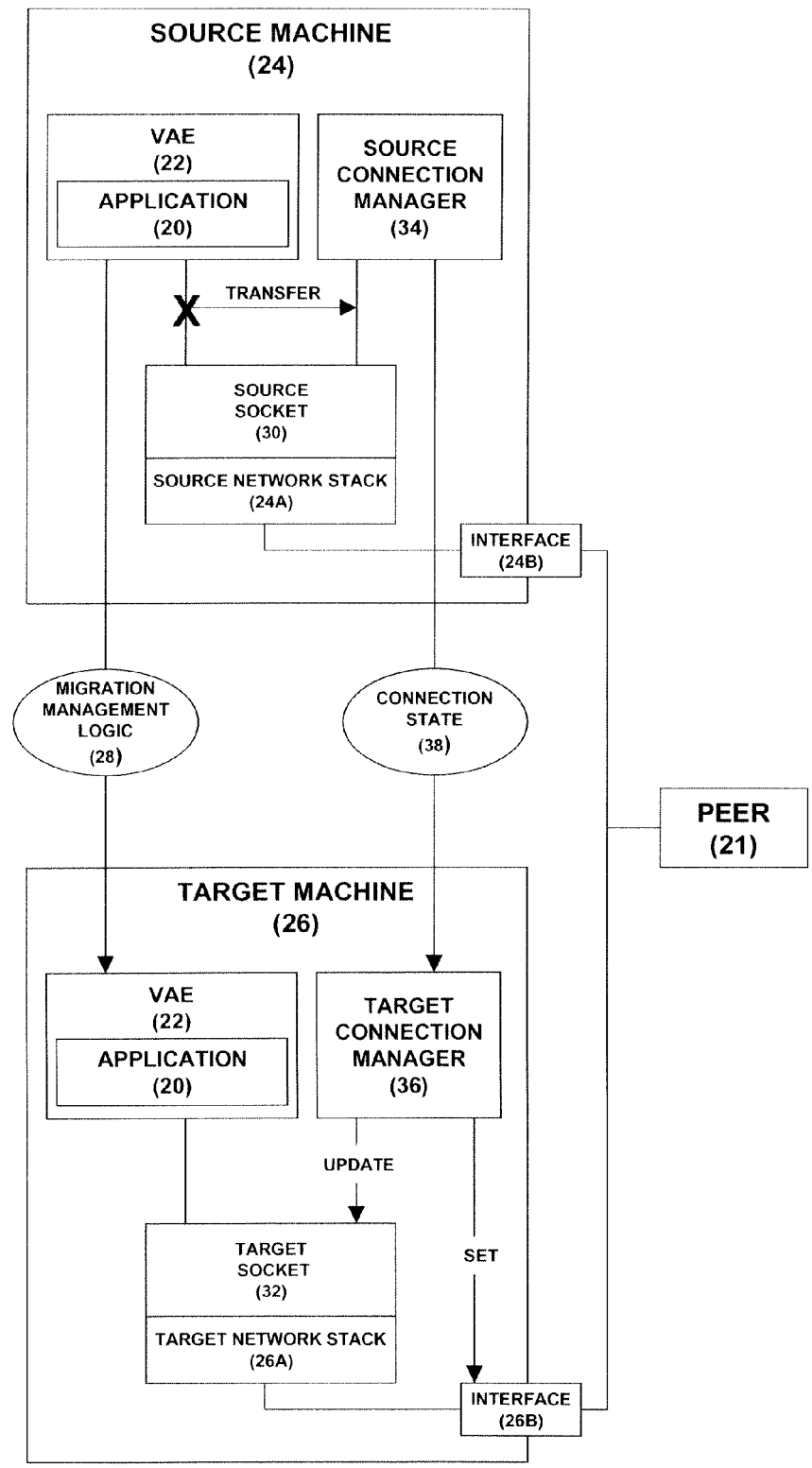
FIG. 3 is a functional block diagram showing exemplary components for implementing improved network connection failover during application service interruption.

FIG. 3 is illustrative of one exemplary implementation of network connection failover in which an application 20 (e.g., any of the applications $10_1$, $10_2$, $10_3$ and $10_4$ of FIG. 1) engaged in network communication with a remote network peer 21 becomes temporarily unavailable as a result of migration from one data processing system to another. By way of example only, the application 20 is assumed to be contained within a virtual application environment (VAE) 22 (e.g., any of the virtual application environments $8_1$, $8_2$, $8_3$ and $8_4$ of FIG. 1) that is undergoing migration from a source machine 24 (e.g., the data processing system 2 of FIG. 1) to a target machine 26 (e.g., the data processing system 2A of FIG. 2). The migration may be handled by migration management logic 28 (e.g., the migration management logic 12 of FIG. 2) implemented in any of various ways described above, and which is additionally adapted to support network connection failover as disclosed herein.

On the source machine 24, the application 20 communicates with the peer 21 via a source socket 30, a source network stack 24A and a source network interface 24B. Before migration, the source socket 30 is owned by the application 20 due to the application having established the source socket and by maintaining a file descriptor thereto that the application uses to pass data to and from the peer 21 using conventional socket read/write operations. After the application 20 has been migrated to the target machine 26 and network connection failover has completed, the application communicates with the peer 21 via a target socket 32, a target network stack 26A and a target network interface 26B. Following migration, the application 20 owns the target socket 32 by maintaining a file descriptor thereto that the application use to pass data to and from the peer 21 using conventional socket read/write operations.

FIG. 3 illustrates one embodiment of network connection failover in which two connection managers respectively running on the source and target machines 24 and 26 are used to perform the failover operations. Other embodiments using alternative connection failover processing are described below in connection with FIGS. 7 and 9. In FIG. 3, a source connection manager 34 may be used to handle an initial portion of the network connection failover. During this operation, the source socket 30 is disassociated from the application 20 prior to migration. A target connection manager 36 may be used to handle the final portion of the network connection failover in which the target socket 32 is updated with the connection state information 38 from the source socket 30 and activated following migration. Importantly, neither of the connection managers 34 or 36 needs to be a full-fledge copy of the application 20. Rather, the connection managers 34 and 36 may each be implemented in software such as operating system code (e.g., one or more kernel modules) respectively executing on the source and target machines 24 and 26, or as combined user space/kernel code. The connection managers 34 and 36 could also be implemented using firmware or hardware logic.

As described in more detail in connection with FIG. 4, the connection managers 34 and 36 function to cache the state of the migrating application's network connection during the period that the application remains quiescent due to the migration. The source connection manager 34 also takes over operation of the source network socket 30, allowing the transport protocol layer of the source network stack 24A to continue managing the network connection. The target connection manager 36 is responsible for setting up the application's network connection on the target machine 26. Its functions include receiving the network connection state information 38 from the source connection manager 34, updating the network stack 26A on the target machine 26, and activating the target socket 32 following successful migration.

Figure 4:
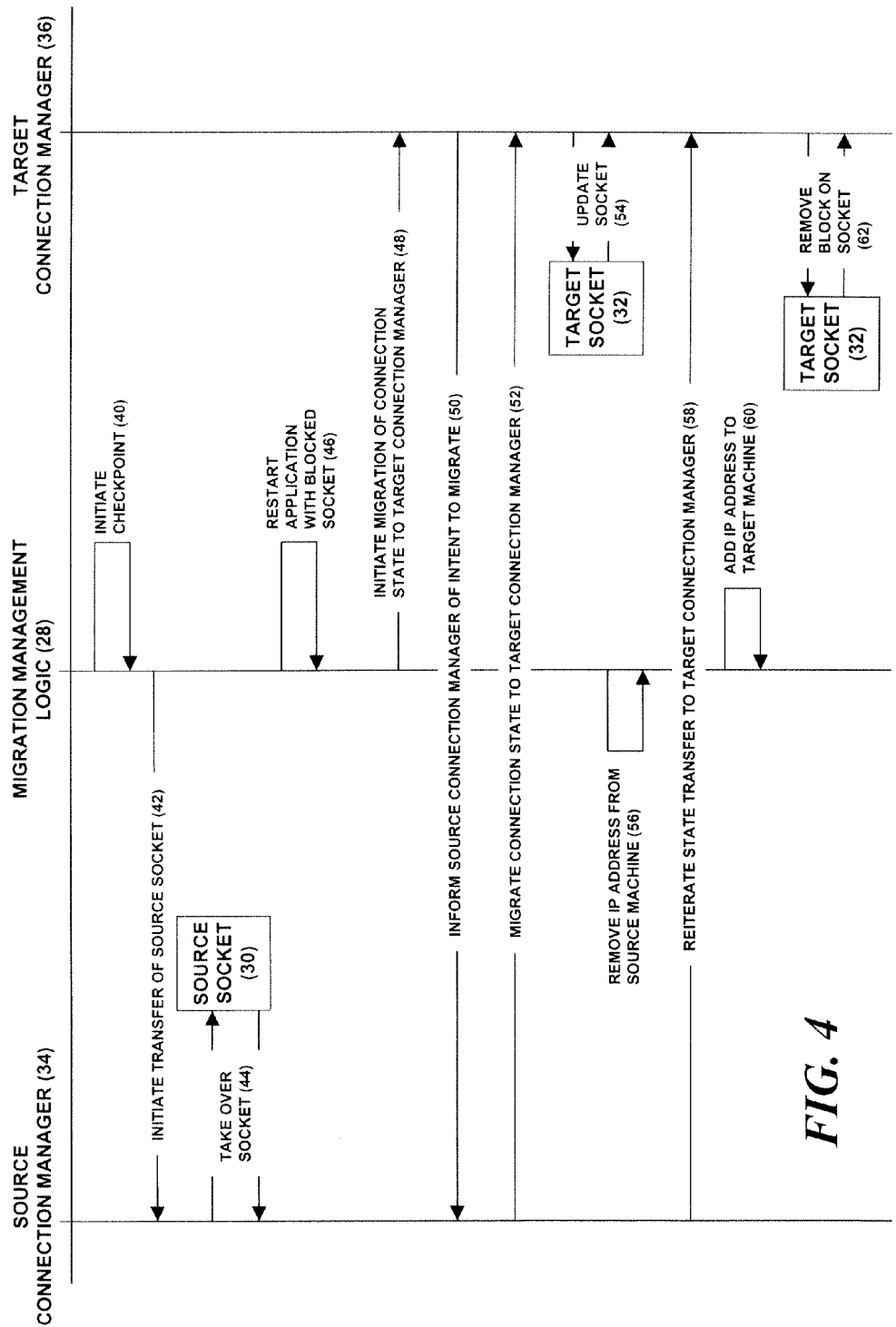
FIG. 4 is a flow diagram illustrating exemplary operations that may be performed to implement network connection failover using the components of FIG. 3.
Figure 5:
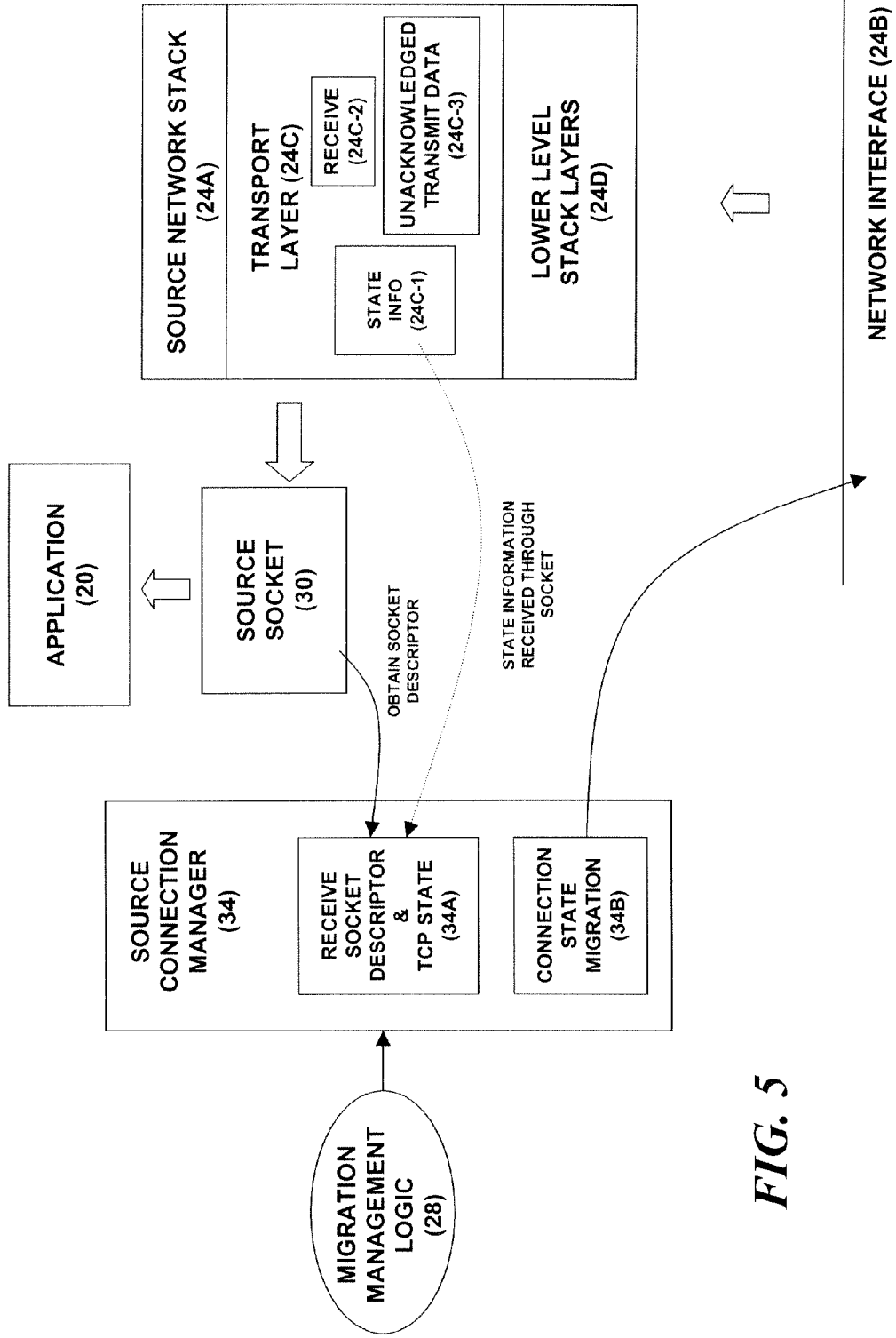
FIG. 5 is a detailed functional block diagram of an exemplary source machine engaged in network connection failover.

FIG. 4 illustrates exemplary processing that may be performed to implement network connection failover in the embodiment of FIG. 3 (in which both the source and target connection managers 34 and 36 are used). FIG. 5 illustrates exemplary logic within the source connection manager 34 that is involved in a first portion of the network connection failover operations of FIG. 4. FIG. 5 also illustrates the source socket 30, the source network stack 24A and the source interface 24B. The source network stack 24A includes a conventional transport layer 24C and conventional lower level protocol layers 24D. The transport layer 24C maintains TCP state information 24C-1, as well as a receive buffer 24C-2 for incoming packets and transmitted but unacknowledged data 24C-3 for outgoing packets, all of which is conventional.

In block 40 of FIG. 4, application checkpointing and migration is initiated by the migration management logic 28. As is known in the art, this conventional operation may be initiated by having the migration management logic 28 start trapping calls from the application 20, then saving the application's in-memory state (e.g., to permanent storage) so that the saved application state information can be later redeployed on the target machine 26. In block 42, the migration management logic 28 requests the source connection manager 34 to assume control of the source socket 30 and maintain it. The source connection manager 34 may implement a suitable API (Application Programming Interface) that the migration management logic 28 may use to initiate the socket control transfer.

The socket control transfer will allow the source connection manager 34 to access all or a portion of the TCP state information 24C-1 (FIG. 5), as will be required to later pass the network connection state information 38 to the target connection manager 36 following the application migration. The TCP state information may include, but is not limited to, the "4-tuple" source and destination addresses and port numbers, various TCP flags such as the TCP window size, the window scaling option (if any), Selective ACKnowledgement (SACK) options data (if any), the Initial Send Sequence number (ISS), the current sequence and acknowledgement numbers, the current state of the receive buffer 24C-2, and transmitted but unacknowledged data 24C-3. Note that the actual buffer contents are not required insofar as the source connection manager 34 is only required to keep the connection alive and maintained, not to process the application's network data.

During application checkpointing and migration, the source socket 30 is no longer be readable by the application 20 and the socket's buffering may be reduced by the source connection manager 34 to the actual window size. The local IP address will be visible to the root context of the application environment 22, but no other application can use or access it. One exemplary mechanism for transferring control of the source socket 30 to the source connection manager 34 will now be described. When the application 20 is checkpointed, the virtual application environment 22 will be stopped (frozen) by the migration management logic 28 using a conventional technique, such as the checkpointing operation performed by operating system-level virtualization systems described above, including IBM® Meiosys virtualization products. Instead of deleting the socket descriptor used by the application 20 to access the source socket 30 (which would ordinarily result in destruction of the socket's kernel data structures), the source connection manager 34 is informed by the migration management logic 28 of the source socket 30. In particular, as part of block 42 of FIG. 4, the migration management logic 28 provides the source connection manager 34 with the source socket's "5-tuple" information consisting of the source and destination address and port numbers, and the protocol. This information is used by socket descriptor/TCP state receive logic 34A (FIG. 5) of the source connection manager 34 to access the source socket 30 and open a duplicate file descriptor to the socket. This socket access operation, which is part of block 44 of FIG. 4, may be handled in a variety of ways. For example, the logic 34A may include a user space component that makes a system call to a kernel module component of the logic 34A (or other operating system code) that provides a special system call handler. The system call parameters pass some or all of the 5-tuple information for the source socket 30. The system call handler uses this parameter information to determine the identity of the source socket 32 and set a flag that enables the creation of a duplicate file descriptor so that a new "application" (the source connection manager 34) may access the socket. This will allow the source socket 30 to be kept open and maintained by the source connection manager 34 while its logic 34A keeps track of the source socket state (e.g., whether it is active or quiesced) using conventionally available query mechanisms.

The flag that allows the source connection manager 34 to access the source socket 30 could be a special purpose flag that allows one socket to be opened by several applications. This flag could thus be modeled on the conventional SO_REUSEPORT flag that allows multiple applications to bind to the same port. In such a case, the source connection manager 34 may open the source socket 30 with the special flag specified and will obtain a duplicate socket file descriptor. One issue relative to using such a flag is that it might allow other applications or another instance of the same application to also open the source socket 30. Therefore, a socket flag with similar features but higher security could be created as an alternative. By way of example, the flag may signify that only a root user in the global context of the virtual application environment 22, or a user with special security privileges, can open a socket marked with this flag. Another option would be to create a special system call that takes the socket's 5-tuple information and returns a duplicate socket linked to the existing socket infrastructure.

If desired, the source connection manager 34 may also be provided (in block 42 of FIG. 4) with an identifier (container ID) that identifies the virtual application environment 22. At the time the source connection manager 34 is requested to accept the source socket 30, the migration management logic 28 may calculate a hash based on a timestamp, the source socket 5-tuple, and the container ID (or other suitable elements). This hash may be saved by the migration management logic (in the checkpoint image) and also provided to the source connection manager 34. As described in more detail below, the hash may be used to authenticate a subsequent request for connection state migration from the source connection manager 34 to the target connection manager 36.

Returning now to FIG. 4, as a further part of block 44, the source connection manager 34 assumes responsibility for the connection associated with the source socket 30 (i.e., the connection between the source socket 30 and the peer 21), but is not itself required to perform any network processing. Instead, the source connection manager 34 allows the transport layer 24C of the source network stack 24A to sustain the network connection by performing its normal TCP functions. These functions include accepting all data that is received from the remote network peer 21 and, using the TCP state, responding with an acknowledgement (ACK) while reducing the TCP window size in accordance with the data accepted (into the TCP receive buffer). Thus, the peer 21 is not forced to retransmit and retry, or in a worse case drop the connection. If the TCP window fills up, the peer 21 can be given a zero-sized window, thereby sending it into a persist state. This state does not timeout and the peer will periodically send persist probes that can be responded to by ACK responses generated by the transport layer 24C. If the peer 21 sends a keepalive probe, an ACK response can be sent to keep the connection alive. If the connection is closed by the peer, the connection can be maintained in the TCP CLOSE_WAIT state until the application is restarted and an ACK response is sent to close the connection. As indicated above, the foregoing processing is performed automatically by the transport layer 24C of the source network stack 24A. The source connection manager 34 does not need to be involved in this processing or any other aspect of sustaining the application's network connection to the peer 21 other than ensuring that the source socket 30 is maintained.

The virtual application environment 22 will normally be kept in a suspended state until there is successful migration of the application 20 and its network connection state information 38 to target machine 26. However, the source network stack 24A is not quiesced and continues to accept packets at the local IP address of the source socket 30. If for some reason the virtual application environment 22 is terminated before the successful migration is complete, then the source network stack 24A must be kept alive. This may be accomplished by ensuring that the network interface 24B to which the source socket's local IP address is associated is not deactivated (e.g., by disabling its driver). The interface 24B may be a virtual interface used by the virtual application environment 22 or a real interface to which the socket's local IP address is associated in the virtual application environment's global context.

Figure 6:
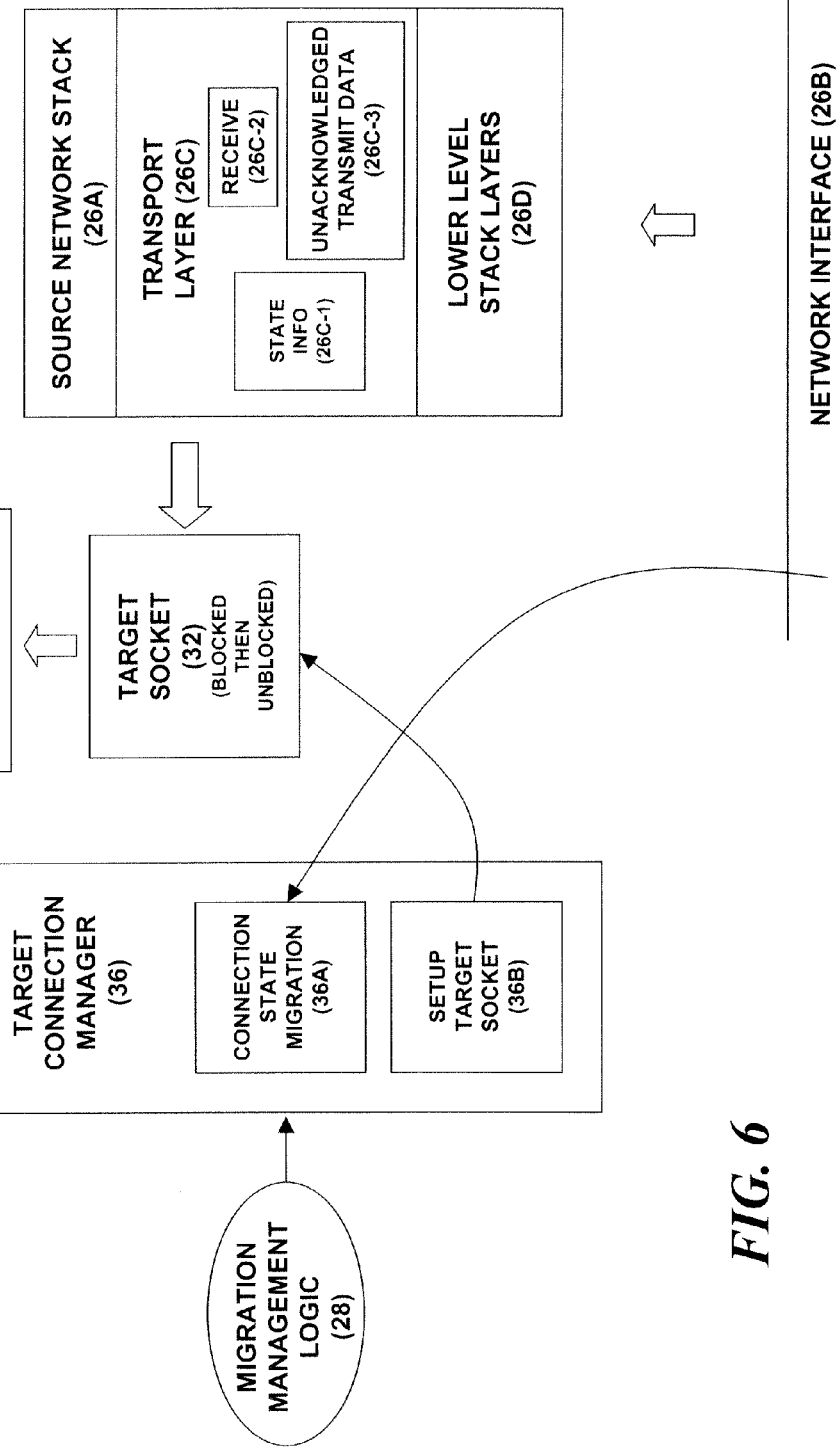
FIG. 6 is a detailed functional block diagram of an exemplary source machine engaged in network connection failover.

The migration of the application 22 from the source machine 24 to the target machine 26 is handled by the migration management logic 28 in conventional fashion. Once the migration of the virtual application environment 22 to the target machine 26 has been completed, the application 20 is ready to be restarted and the TCP connection is ready to be migrated from the source connection manager 34 to the target connection manager 36. FIG. 6 illustrates exemplary logic within the target connection manager 36 that is involved in this second portion of the network connection failover operations of FIG. 4. FIG. 6 also illustrates the target socket 32 and the transport layer 26C of the target network stack 26A. The transport layer 26C maintains TCP state information 26C-1, as well as a receive buffer 26C-2 for incoming packets and transmitted but unacknowledged data 26C-3 for outgoing packets, all of which is conventional. The lower layers of the source network protocol stack are shown by reference numeral 26D, and are also conventional.

In block 46 of FIG. 4, the migration management logic 28 restarts the application 20 on the target machine 26 with the target socket 32 in a blocked state. Note that bringing up an application's socket(s) in a blocked state is normally part of conventional application migration, and means that the socket data structures and socket descriptor(s) are recreated from the application's checkpoint information, and each socket is recreated with the 5-tuple consisting of the local and peer IP addresses, the local and peer port numbers, and the protocol. Transfer of the network address and port information from the source machine 24 to the target machine 26 can be handled in conventional fashion by the migration management logic 28. At this point, however, the local IP address of the blocked target socket 32 is not yet associated with the network interface 26B on the target machine 26. Therefore, no packets are received at the blocked target socket 32. Note that the local IP address/port number of the blocked target socket 32 will be the original local IP address/port number associated with the source socket 30 on the source machine 24. The local IP address/port number information is assigned to the blocked target socket 32 as part of the application migration process.

In block 48 of FIG. 4, the migration management logic 28 requests the target connection manager 36 (via an appropriate API built in to the connection manager) to migrate the connection state information 38 from the source connection manager 34. The migration management logic 28 may provide the target connection manager with the hash value that was recorded at the time of checkpointing the application 20. Alternatively, the migration management logic 28 could request the source connection manager 34 to push the connection state information 38 to the target connection manager 36. In block 50 of FIG. 4, connection state migration logic 36A (FIG. 6) in the target connection manager 36 issues a network request to the source connection manager 34 to initiate the migration of connection state information 38 for the source socket 30. The destination IP address used for the migration request is an address in the global context of the virtual application environment 22 on the source machine 24. Connection state migration logic 34B (FIG. 5) in source connection manager 34 maintains a network service listening port for receiving the migration request. The target connection manager 36 may identify this service port using any of various known mechanisms. Alternatively, the listening port could be assigned to a well-known port number. In block 52 of FIG. 4, the source connection manager 34, after authenticating the hash, sends its current connection state information 38 (this includes but is not limited to the TCP state, window size, etc.) to the target connection manager 36. Once the target connection manager 36 has acquired the connection state information 38, its target socket setup logic 38B (FIG. 6) updates the network connection state of the blocked target socket 32, as shown in block 54 of FIG. 4. This entails the target connection manager 36 updating the relevant socket data structures of the target network protocol stack 26A with the connection state information 38 to conform the network connection state of the blocked target socket 32 to the current state of the source socket 30.

The target connection manager 36 may also use a system call (e.g., the same as that used by the source connection manager 34) for setting a flag on the target socket 32 that allows the target socket to be accessed via a duplicate file descriptor. The target connection manager 36 may then use the duplicate file descriptor to access the target socket 32 using an input/output control command (e.g., a Linux® ioctl command) to update the socket state. If desired, special capability or credential checking may be put in place to ensure that no other application is able to update the target socket state. Another condition that may be enforced is that the target socket state can be updated only as long as is not associated with an active IP address (the IP address is not yet bound to a local interface).

In block 56 of FIG. 4, the migration logic 28 removes the local IP address from the source machine 24 (e.g., upon request from the target connection manager 34). In block 58 of FIG. 4, the source and target connection managers 34 and 36 reiterate on the connection state migration of block 52 to ensure nothing was missed or changed during the short time between the initial connection state migration and the source IP address being removed. This operation may not be needed if the source socket 30 was in a "persist" state or one of the protocol close states in which no additional data can transfer or no state changes can occur with respect to the source socket. Under these conditions, there will be no new state information that needs to be transferred to the target migration manager 36.

The migration management logic 28 then adds the local IP address of the target socket 32 to the target network interface 26B in block 60 of FIG. 4. It may also optionally send out a gratuitous ARP (Address Resolution Protocol) request to update the ARP cache of the remote peer 21 (and other network peers) with the MAC (Media Access Control) address of the target network interface 26B. In some networks, gratuitous ARP requests are ignored. In such a network, the virtual application environment 22 may be created on the target machine 26 with a locally administered MAC address being associated therewith. This MAC address may be created using an agreed upon rule, and in this way may be associated with the new network endpoint. At this point, the target connection manager 36 may close its handle to the target socket 32. However, the target socket 32 is kept open by the migrated application 20, which has its own socket file descriptor.

At this stage, the blocked target socket 32 has the correct network connection state and is associated with the proper IP address in order to receive and send data. The migration management logic 28 is informed of this status and it enables the application 22. The target connection manager 36 then removes the block on the target socket 32 in block 62 of FIG. 4. Unblocking the socket on the target machine 26 entails the target connection manager 36 inserting the local IP address and port number for the target socket 32 into kernel routing and TCP lookup tables. Once this happens, new packets received or sent will be correctly processed. Note that if the migration operation fails, the application 20 may be restarted on the source machine 24. Its IP address will then be reenabled and source socket 30 can be reattached. The source connection manager 34 may be quiesced once it is no longer required by the migration operation.

It should be noted that the ordering of the foregoing processing could be changed so that the connection to the peer 21 is migrated immediately after the application 20 is checkpointed and before it is restarted on the target machine 26. Instead of waiting for the checkpointed application to be restarted at on the target machine 26, as per block 46 of FIG. 4, the IP address and connection transfer of blocks 48-52 could be initiated as soon as the application 20 is blocked during the checkpoint operation. In lieu of block 46 of FIG. 4 being implemented prior to the connection migration, the target connection manager 36 would create the target socket 32, migrate the connection per blocks 48-52 of FIG. 4, and then update the socket's kernel structures per block 54 of FIG. 4. The IP address and port number of the source socket would then be removed from the source machine 24 and associated with the target machine 26 per blocks 58 and 60 of FIG. 4. As per block 62 of FIG. 4, the target connection manager 36 would also update the TCP lookup and routing tables so that the target socket 32 becomes operational. The TCP state of the target socket 32 would thus be valid when the application 20 is restarted on the target machine 26. The application restart logic implemented by the migration management logic 28 would find that the target socket 32 already exists. Optionally, it may verify that the connection is the same connection that existed on the source machine 24 using the 'hash' stored by the migration management logic 28 in the checkpoint image. The target connection manager 36 may then close its handle to the target socket 32.

Figure 7:
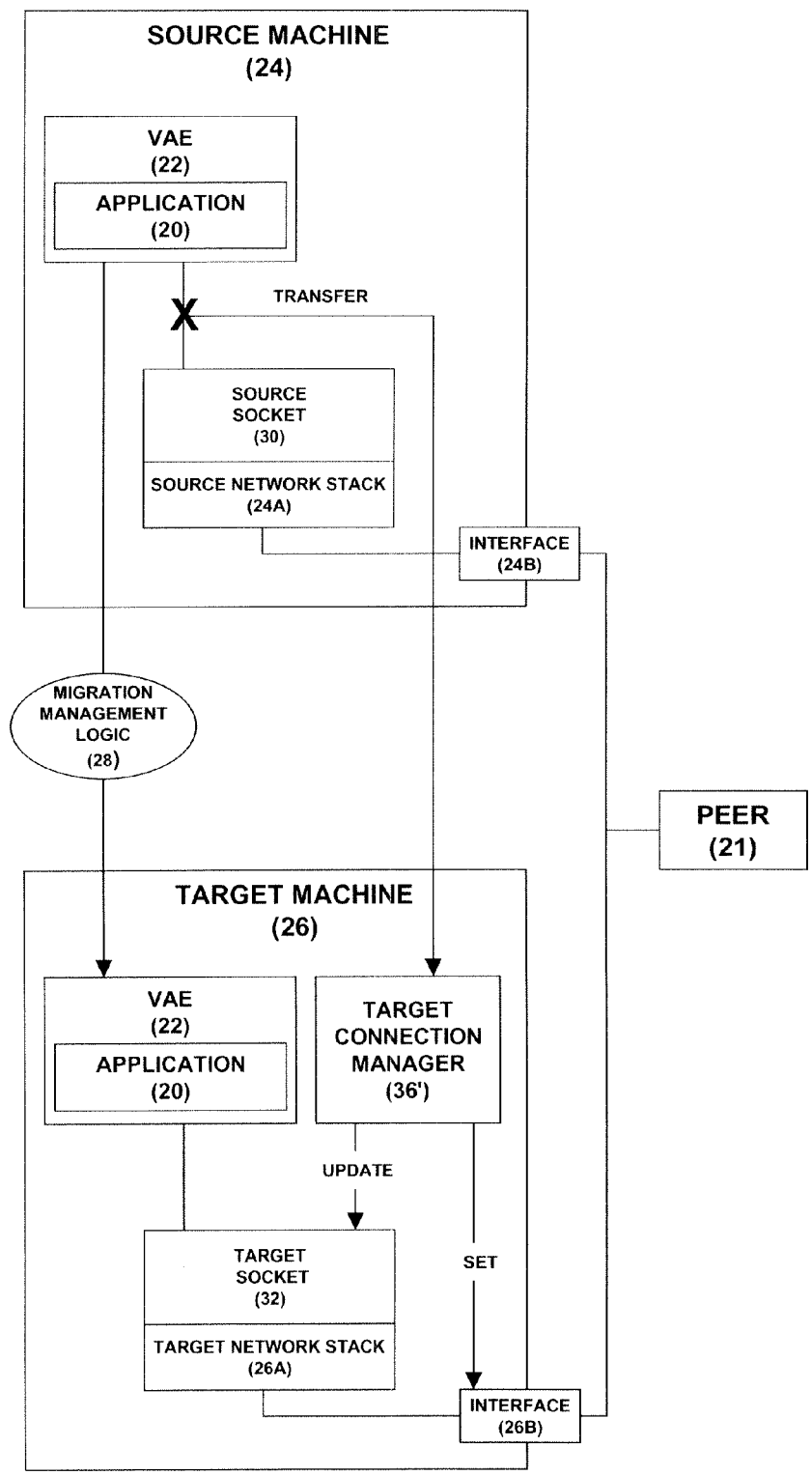
FIG. 7 is a functional block diagram showing exemplary alternative components for implementing improved network connection failover during application service interruption.
Figure 8:
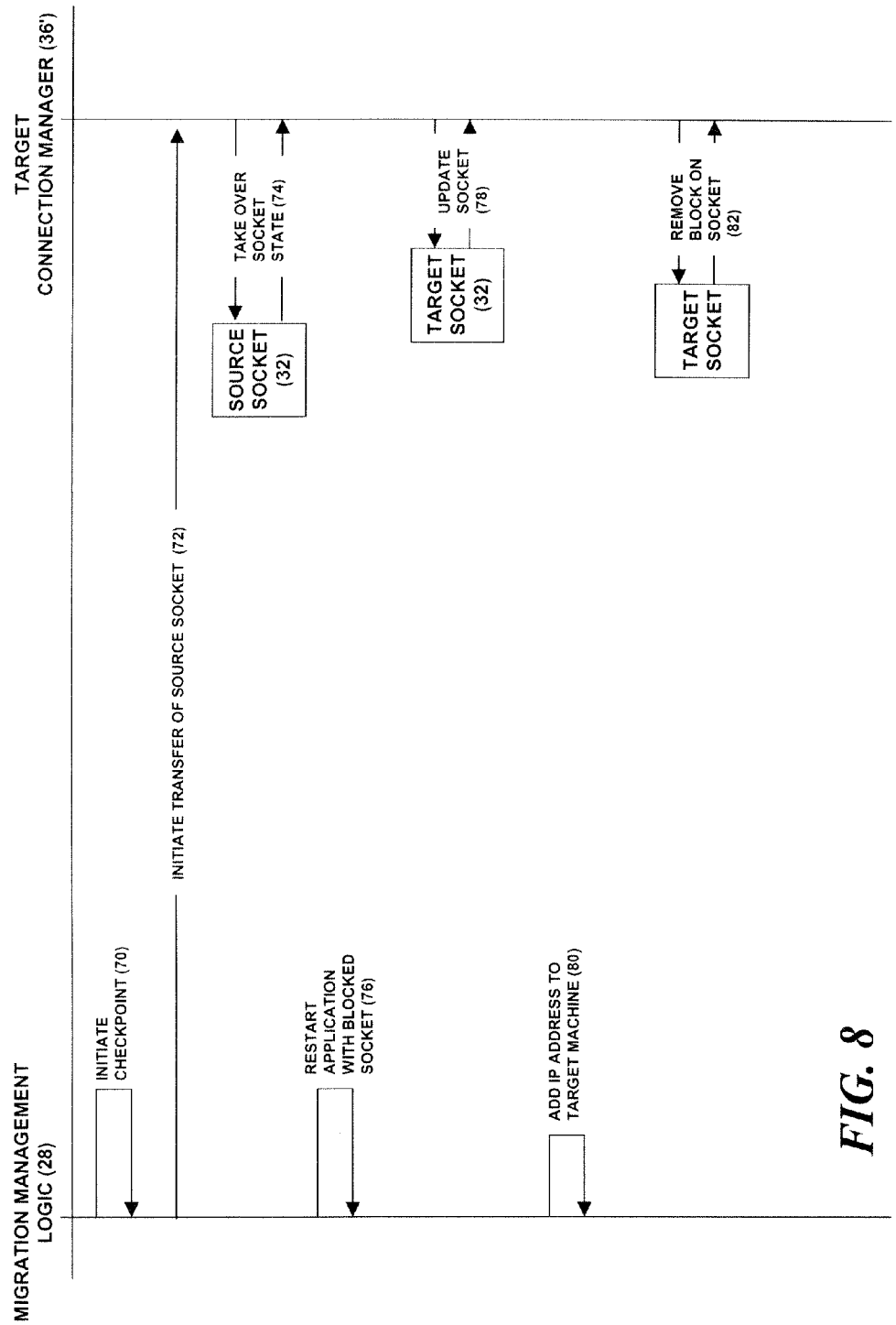
FIG. 8 is a flow diagram illustrating exemplary operations that may be performed to implement network connection failover using the components of FIG. 7.

FIG. 7 is illustrative of another exemplary implementation of network connection failover. FIG. 7 depicts essentially the same hardware and software components as FIG. 3. The only difference is that the source machine 24 no longer includes a source connection manager. Instead, the target machine 26 has a modified target connection manager 36' that functions as both a source connection manager and a target connection manager. Instead of transferring the source socket 30 on the source machine 24 to a source connection manager, and thereafter transferring connection state information to a target connection manager, the source socket 30 is transferred to the target connection manager 36'. This may be handled in the same manner as the source connection manager 34 in the discussion above, except that the system call that allows the source socket 30 to be opened with duplicate file descriptors will be a remote procedure call from the target machine 26. Then there is no need for a subsequent transfer of connection state information because the target connection manager 36' already has up-to-date information. Exemplary processing is illustrated in FIG. 8. In block 70 of FIG. 8, application checkpointing is initiated by the migration management logic 28 as per block 40 of FIG. 4. In block 72 of FIG. 8, the migration management logic 28 passes the source socket's 5-tuple information to the target connection manager 36' and requests that it assume control of the source socket 30. This operation is the similar to the one performed in block 42 of FIG. 4, except that the recipient connection manager is on the target machine 26 rather than the source machine 24. Moreover, the local IP address of the source socket may now be removed from the source machine, as per block 56 of FIG. 4. In block 74 of FIG. 8, the target connection manager 36' takes over the source socket 30 and assumes responsibility for the migrating application's network connection in the same manner as described per block 44 of FIG. 4. In block 76 of FIG. 8, the application 20 is restarted on the target machine 26 following migration, as per block 46 of FIG. 4. In FIG. 8, there are no counterparts to blocks 48, 50 and 52 of FIG. 4. Instead, in block 78 of FIG. 8, the target connection manager 36' sets up the connection state for the migrated application 20 on the target machine by updating the target socket 32 with the current connection state information of the source socket 30, as per block 54 of FIG. 4. Block 80 of FIG. 8 is then performed in which the migration management logic 28' adds the IP address for the source socket 30 to the target machine 26, as per block 60 of FIG. 4. In block 82 of FIG. 8, the target connection manager 36' removes the block on the target socket 32, as per block 62 of FIG. 4.

Figure 9:
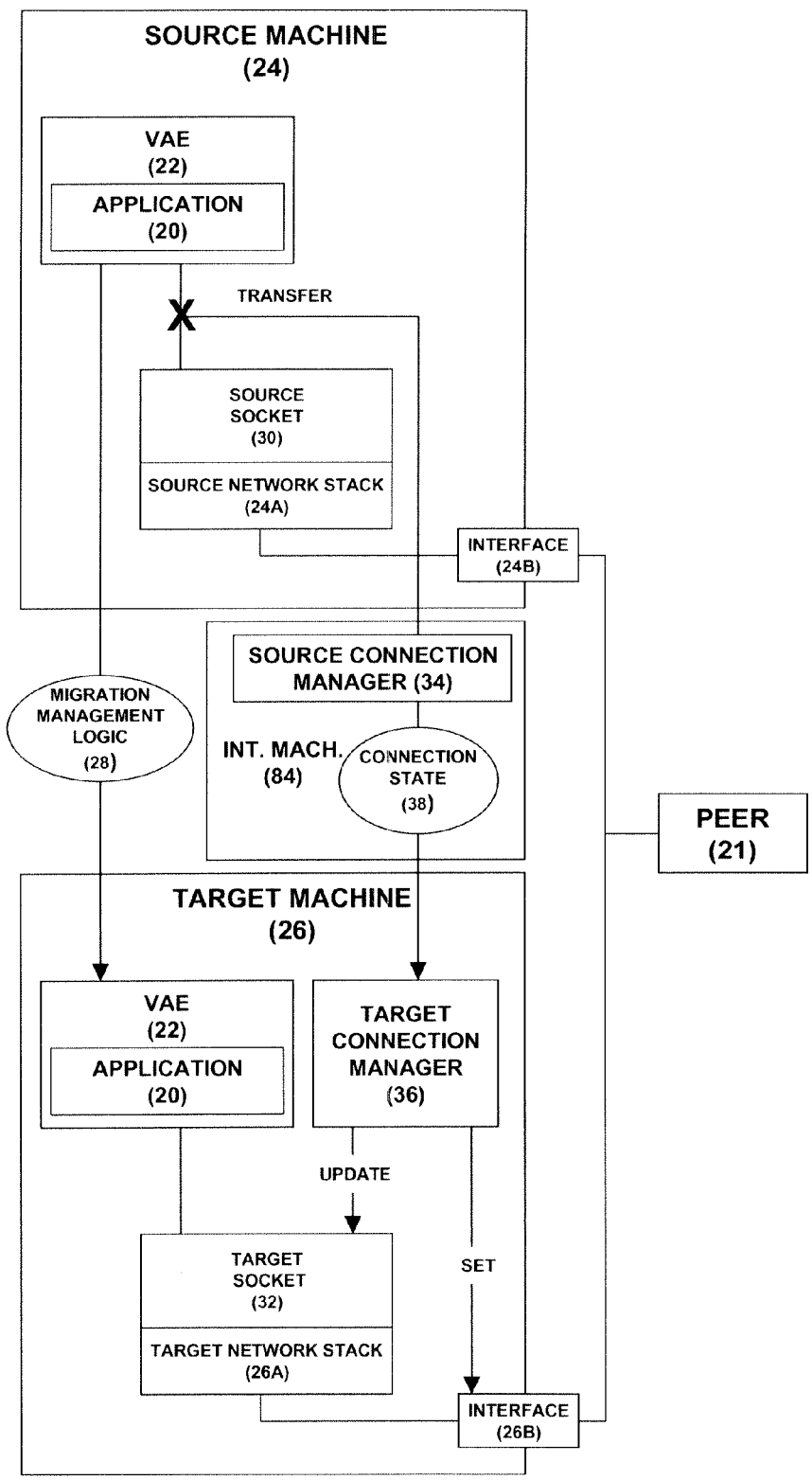
FIG. 9 is a functional block diagram showing exemplary further alternative components for implementing improved network connection failover during application service interruption.

FIG. 9 is illustrative of another exemplary implementation of network connection failover. FIG. 9 depicts essentially the same hardware and software components as FIG. 3. The only difference is that the source connection manager 34 has been moved from the source machine 24 to an intermediary machine 84. Other than having to accommodate the new location of the source connection manager 34, network connection failover processing is the same as in FIG. 4. The TCP connection state and IP address are thus transferred to intermediary machine 84, which then takes over as the source connection manager 34 during network connection failover.

Figure 10:
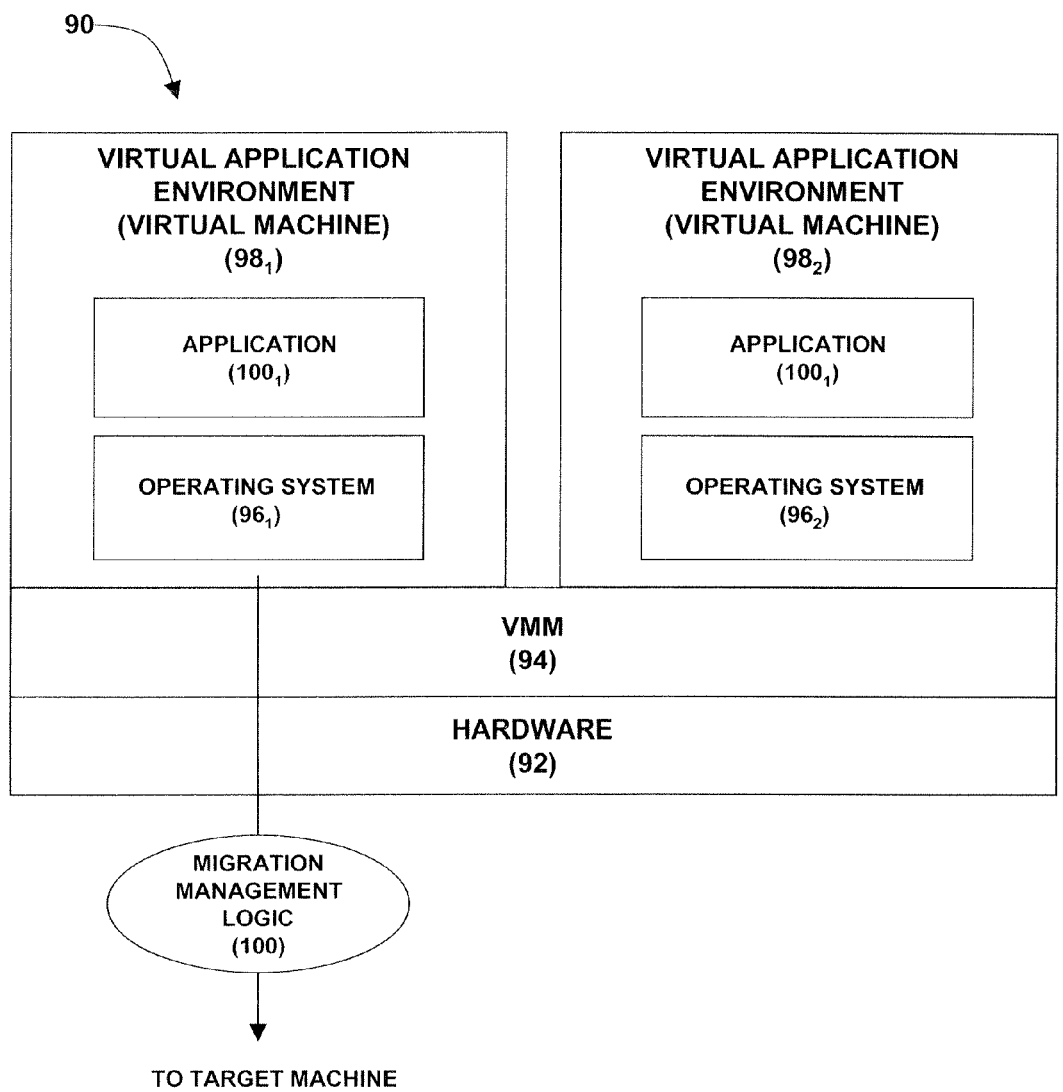
FIG. 10 is a functional block diagram showing an alternative data processing system supporting virtual application environments.

Turning now to FIG. 10, an alternative data processing system 90 is shown to illustrate that the network connection failover technique disclosed herein is not limited to operating system-level virtualization of the type shown in FIG. 1. Rather, the concepts disclosed herein are applicable to any virtual environment. The data processing system 90 represents one such alternative environment wherein a hardware platform 92 runs a virtual machine monitor (VMM) 94, also known as a hypervisor. The VMM 94 supports multiple operating system instances, such as operating systems $96_1$, and $96_2$, each of which operates in a virtual machine environment $98_1$, and $98_2$ created by the VMM. These virtual machines represent an alternative form of virtual application environment that respectively supports applications $100_1$ and $100_2$, but also includes the operating systems $96_1$, and $96_2$. Application migration in the environment of FIG. 10 involves moving an entire virtual machine including its operating system.

As is well known, a VMM is a conventional low level software service that virtualizes the underlying hardware to provide a subset of the CPU, memory and I/O resources (i.e., a virtual machine) on behalf of higher level operating system "guests." The VMM 94 may be implemented according to any of the VMM design concepts that have been in use since hypervisors were first developed in the late 1960s (taking into account the VM support capabilities of the underlying hardware). Existing examples of commercial hypervisors include the CP Control Program used in the IBM VM/370® mainframe product introduced by International Business Machines Corporation in 1972, the current zVM™ hypervisor used in the IBM zSeries® mainframe product, and the hypervisor used in the IBM pSeries® and iSeries™ PowerPC products. A Linux® kernel compiled to support the Xen Domain-0 virtual machine monitor and one or more Xen Domain-1, Domain-2, . . . Domain-n virtual machines is another example. Other open source virtualization solutions supported by recent Linux® kernels, such as Qemu and KVM (Kernel-based Virtual Machine), could potentially also be used. Note that the reference to the foregoing technologies is not intended to suggest that the invention is limited to particular product offerings.

The processing used to implement network connection failover in the data processing system 90 is analogous to the failover technique used for the data processing system 2 of FIG. 1. However, the global context of the virtual application environments $98_1$, and $98_2$, is the VMM 94. As such, the connection managers could be implemented in whole or in part within the VMMs of source and target machines or within virtual machines supported by such VMMs (see below). Conventional techniques are available to migrate VMMs from one machine to another, including those implemented by the VMM products described above. Virtual Machines can be quiesced and saved as files that are easily transferred from one machine to another. The migration management logic 100 that implements this operation in the VMM environment of FIG. 10 would be analogous to the migration management logic 28 described above.

For example, when migrating a virtual application environment that includes an operating system, the migration management logic may suspend the source virtual application environment, then copy its memory image (e.g. as a file) and restart it on the target machine. An alternative technique is to first copy the virtual application environment image to the target machine and then copy over the memory pages that have been dirtied since the initial transfer. This process may continue with the source virtual application environment continuing to execute until there is a small set of dirty pages (or none). At that point, the target virtual application environment is synchronized with the source virtual application environment. The source virtual application environment is then be suspended and the target virtual application environment is be started. At the end of this process, the IP address of the source virtual application environment is transferred to the target machine, linked to the target virtual application environment, and the migration is complete.

In the first scheme, which may be referred to as "suspend and migrate," the source virtual application environment's network connection might be lost when that environment is suspended and before the target virtual application environment is started. In the second scheme, which may be referred to as "live migration," the network connection could be lost during the migration process and prior to startup of the target virtual application environment. Even if the connection is not lost, the synchronization of the source and target machines and/or the target virtual application start could take a long time. This situation could arise if there is a significant amount of network traffic and related activity, such that the source virtual application environment does not converge to a small set of dirty pages as a result.

In both the foregoing cases, the connection transfer technique described herein may be used to transfer the network connection. For the "suspend and migrate" case, the technique disclosed herein will prevent the peer from dropping the connection following suspension on the source machine and prior to restart on the target machine. For the live migration case, the disclosed technique will allow the source machine version of the virtual application environment to rapidly quiesce its network state because responsibility for its network connection(s) will be taken over by a connection manager. The source and target versions of the virtual application environment may thus be quickly synchronized, thereby speeding up the migration operation.

In the context of the data processing system 90 of FIG. 10, the source and target connection managers could be essentially the same as any of the source and target connection managers described above, except that the operations of the source connection manager would be distributed between the source virtual application environment being migrated (e.g., $98_1$) and either the VMM 94 or a separate virtual application environment (e.g., $98_2$) that could perhaps be dedicated to network connection migration support for other virtual application environments.

Figure 11:
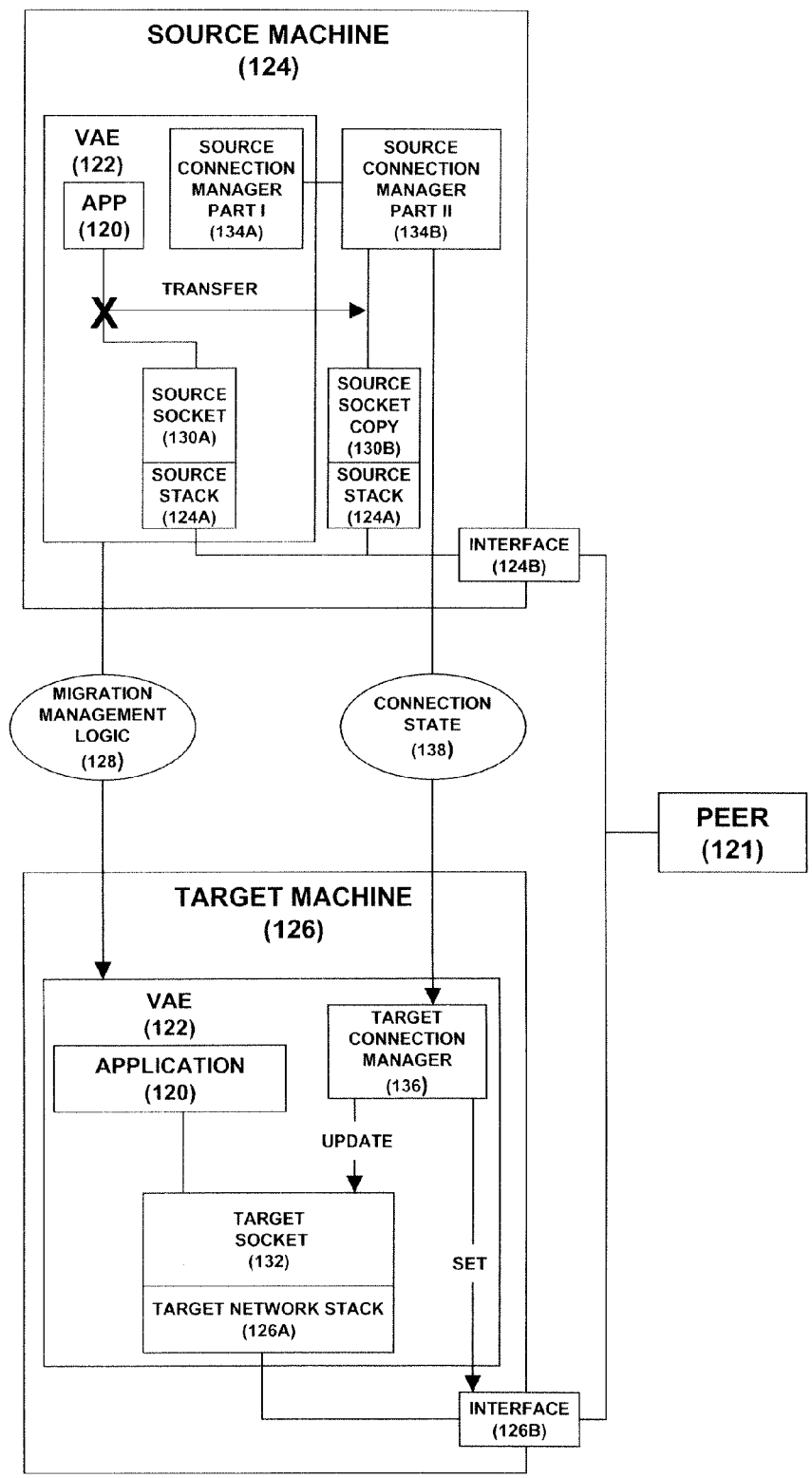
FIG. 11 is a functional block diagram showing exemplary further alternative components for implementing improved network connection failover during application service interruption.
Figure 12:
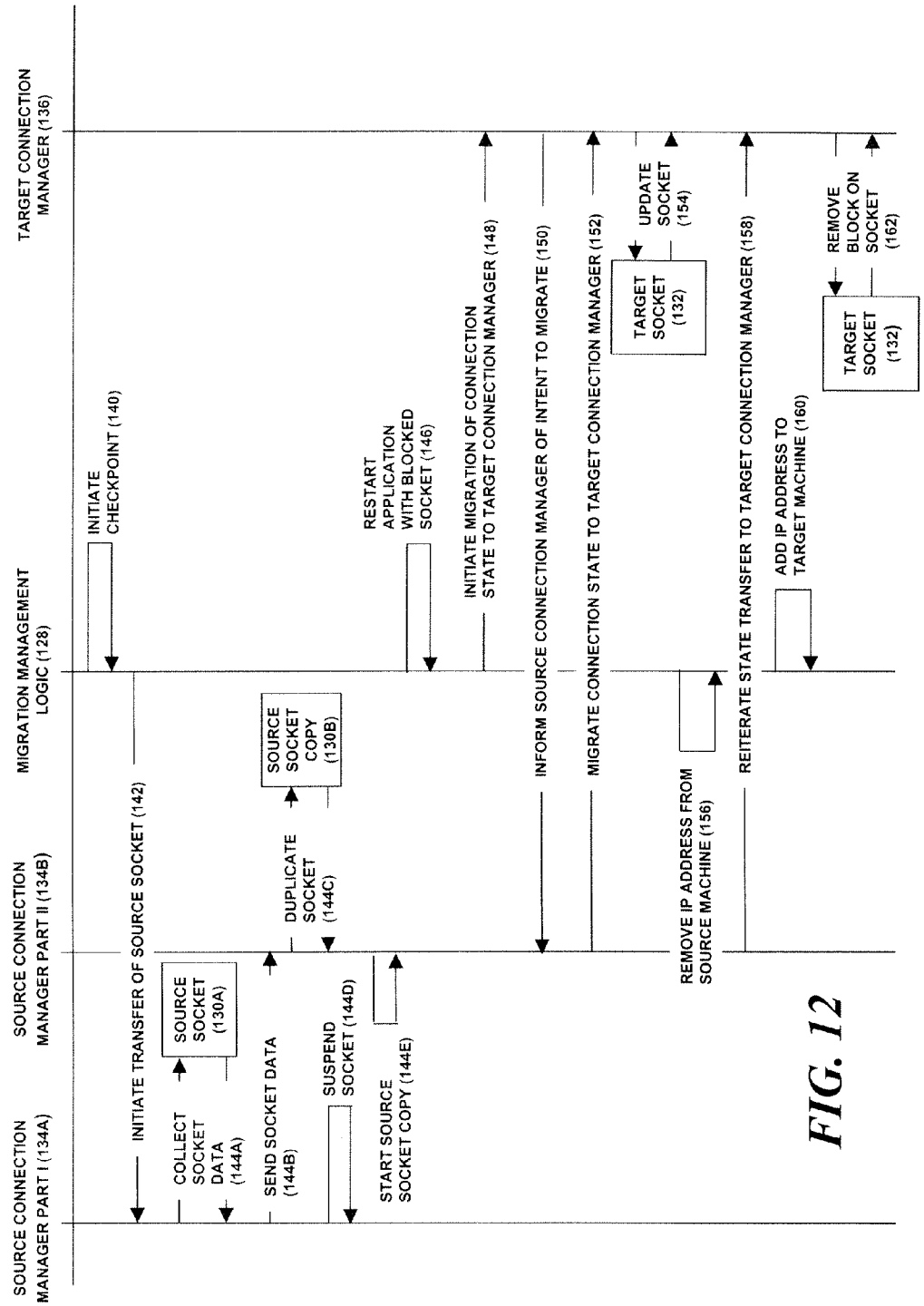
FIG. 12 is a flow diagram illustrating exemplary operations that may be performed to implement network connection failover using the components of FIG. 11.

FIGS. 11 and 12 illustrate one exemplary embodiment that may be used to implement connection failover in a VMM environment such as FIG. 10. In FIG. 11, the components 124-138 are analogous to the components 24-38 of FIG. 3, as indicated by the use of corresponding reference numerals incremented by 100. The main difference is that the virtual application environment 122 is based on one of the virtual application environments $98_1$, or $98_2$ of FIG. 10, and thus represents a virtual machine containing an integrated operating system. Another difference is that the source connection manager 134 is distributed between a first part (Part I) 134A situated in the virtual application environment 122 on the source machine 124 and a second part (Part II) 134B situated outside the virtual application environment 122. As indicated above, the connection manager part 134B could reside in the administrative domain of a virtual machine manager (VMM) that hosts the virtual application environment 122 (such as VMM 94 of FIG. 10). The connection manager part 134B could also reside in a separate virtual application environment, such as one dedicated to connection management. A further difference is that there are two versions of the source socket 130, an original version 130A in the virtual application environment 122 on the source machine and a copy 130B associated with the connection manager part 134B. The final difference between FIG. 11 and FIG. 3 is that the target connection manager 136 resides in the virtual application environment 122 on the target machine 126. According to the "suspend and migrate" technique discussed above, an instance of the virtual application environment 122 would not be created on the target machine 126 until the instance on the source machine 124 has been suspended. According to the "live-migration" technique discussed above, instances of the virtual application environment 122 would run simultaneously on the source and target machines 124 and 126.

FIG. 12 illustrates exemplary processing that may be performed to transfer the network connection of the virtual application environment from the source machine 124 to the target machine 126. In block 140, the migration management logic 128 initiates checkpointing of the virtual application environment 122. In block 142, the migration management logic requests the source connection manager part 134A (or part 134B) to initiate transfer of the source socket 142. In block 144A, the source connection manager part 134A collects the TCP state information (socket data) of the original source socket 130A. To facilitate this operation, the operating system of the virtual application environment 122 may be modified to implement an operating system call that performs the socket data gathering operation. The source connection manager part 134A may be implemented as a user space application in the virtual application environment that invokes the system call.

After the system call returns the socket state information, the source connection manager part 134A transfers this information to the source connection manager part 134B, as per block 144B of FIG. 12. The information transfer may utilize a conventional communication mechanism, such as a virtual network communication pathway or other communication mechanism supported by the underlying VMM (e.g. hypersockets on IBM System zSeries® systems). If no special mechanism exists, a local network IP address may be assigned to a network interface associated with the virtual application environment 122 over which this domain can communicate with VMM or virtual machine domain containing the source connection manager part 134B. In block 144C, the source connection manager part 134B assumes control of the original source socket 130A by making a copy thereof 130B using the TCP state information provided by the source connection manager part 134A. This operation may be implemented by way of an input/output control command (e.g., a Linux® ioctl command) to update the socket state. The source manager part 134B would create the source socket copy 130B and invoke the input/output command to populate the socket data structures with the socket data for the original source socket 130A. The source connection manager part 134B may be implemented as a user space application that uses a conventional operating system call to create the socket.

In block 144D, the source connection manger part 134A requests the operating system of the virtual application environment 122 to send an acknowledgement of received but unacknowledged packets and suspend the original source socket 130A. The suspension request to the operating system of the virtual application environment 122 may be implemented in block 144D as a system call that is invoked by the source connection manager part 134A. This could be part of the socket data gathering system call described above, or a separate system call. In block 144E, the source connection manager part 134B transfers the network connection to the source socket copy 130B it has created and activates the socket. Block 144E may be implemented by the operating system of the source connection manager part 134B acquiring the IP address of the network connection and then unblocking the source socket copy 130B. The source connection manager part 134B thereby assumes control of the original source socket 130A by way of its copy 130B, and relies on operating system transport layer services to maintain the network connection to the peer, as described above.

The virtual application environment 122 may now be suspended. Upon restart on the target machine 126 per block 146 of FIG. 12, the networking of the virtual application environment 122 will be initially suspended. The target connection manager 136 is invoked by the migration management logic 128 per block 148 and it contacts the source connection manager part 134B to initiate connection migration per block 150. Blocks 152-162 are then performed as per blocks 52-62 of FIG. 4, and the target connection manager 136 may terminate.

Figure 13:
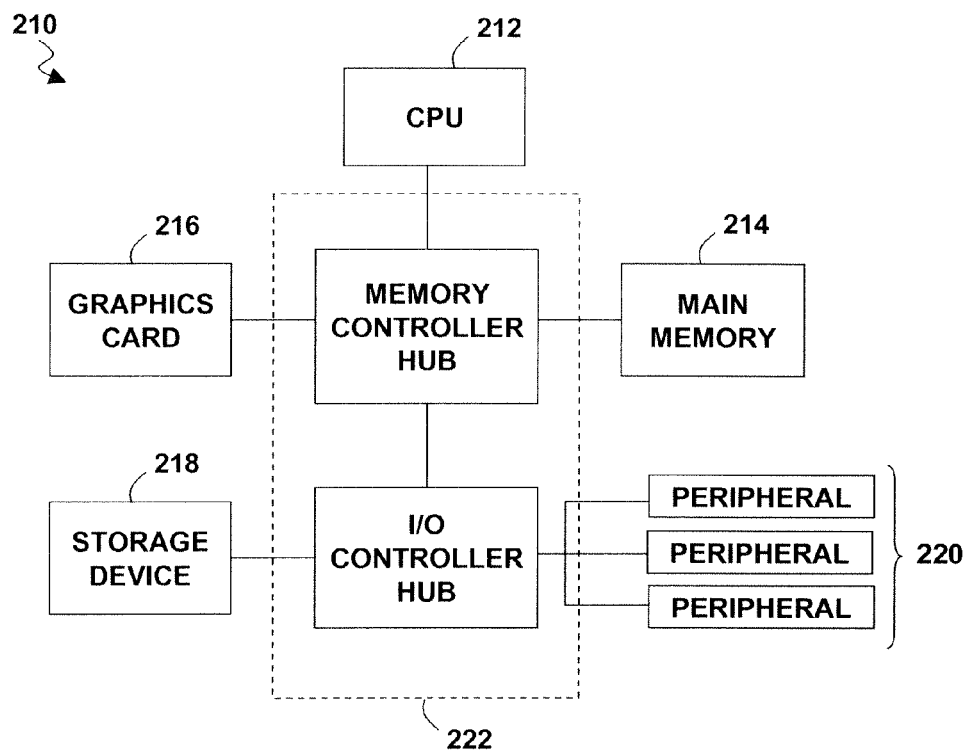
FIG. 13 is a block diagram illustrating an exemplary hardware environment in which the data processing system of FIGS. 1 and 10 may be implemented.

Accordingly, a mechanism for handling network connection failover during application service interruption has been disclosed. It will be appreciated that the foregoing concepts may be variously embodied in any of a data processing system, a machine implemented method, and a computer program product in which programming logic is provided by one or more machine-readable media for use in controlling a data processing system to perform the required functions. Relative to a data processing system and machine implemented method, FIG. 13 illustrates an exemplary hardware environment 210 in which the various data processing systems and machines heretofore described may be implemented. The hardware environment includes one or more of a CPU or other data processing resource 212, a physical memory 214, an optional graphics card 216 for generating visual output to an optional monitor (not shown), a peripheral storage device 218, other peripheral devices 220, and a bus infrastructure 222 interconnecting the foregoing elements. The various virtual application environments described above, as well as the supporting global contexts, migration managers, connection managers, and networking logic, may be implemented as software loaded in the memory 214 for execution on the data processing resource 212. They could also be implemented using hardware logic or firmware in the environment 210. If a user interface is provided, it may be accessed through user interaction with the peripheral devices 220 (e.g., keyboard, mouse, etc.).

Figure 14:
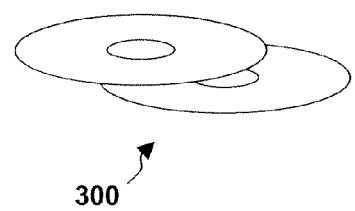
FIG. 14 is a diagrammatic illustration showing physical media that may be used to provide a computer program product for implementing improved network connection failover in accordance with the disclosure herein.

Relative to a computer program product having a machine-readable media and programming logic for controlling a data processing system, exemplary machine-readable media for providing such programming logic are shown by reference numeral 300 in FIG. 14. The media 300 are shown as being portable optical storage disks of the type that are conventionally used for commercial software sales, such as compact disk-read only memory (CD-ROM) disks, compact disk-read/write (CD-R/W) disks, and digital versatile disks (DVDs). Such media can store the programming logic of the invention, either alone or in conjunction with another software product that incorporates the required functionality. Moreover, the network connection failover functionality described herein could be distributed across several media 300, each of which is intended to be used by a different data processing system. The programming logic could also be provided by portable magnetic media (such as floppy disks, flash memory sticks, etc.), or magnetic media combined with drive systems (e.g. disk drives), or media incorporated in data processing platforms, such as random access memory (RAM), read-only memory (ROM) or other semiconductor or solid state memory. More broadly, the media could comprise any electronic, magnetic, optical, electromagnetic, infrared, semiconductor system or apparatus or device, transmission or propagation signal or signal-carrying medium (such as a network), or other entity that can contain, store, communicate, propagate or transport the programming logic for use by or in connection with a data processing system, computer or other instruction execution system, apparatus or device.

Although various embodiments of the invention have been described, it should be apparent that many variations and alternative embodiments could be implemented in accordance with the invention. For example, the disclosed network connection failover technique could potentially be used during other types of applications service interruptions that are not due to application migration. Suspending an application for a system software or hardware upgrade (e.g. replacing a network interface card) would be such a case. The application would be checkpointed but thereafter recreated on the same system. Another case would be where the application is checkpointed due to a need to hotplug new hardware, insert a kernel module or modify an application library (provided this does not affect the application's state). In each case, the target socket could also be the source socket, and thus simply transferred back to the application upon restart. It will also be appreciated that the connection managers described herein may handle multiple network connections simultaneously, which is advantageous for server virtual application environments.

It is understood, therefore, that the invention is not to be in any way limited except in accordance with the spirit of the appended claims and their equivalents.

What is claimed is:

1. A method for implementing network connection failover during application service interruption, comprising:
   quiescing a running application while maintaining a first network socket owned by said application, said first network socket representing an endpoint of a network connection to a network peer on behalf of said application;
   sustaining said network connection whose endpoint is represented by said first network socket in order to keep said network connection alive at said first network socket until a second network socket takes over from said first network socket, said network connection being sustained by controlling said first network socket so that its associated network protocol stack provides acknowledgements of incoming network traffic to said network peer that prevent said network peer from terminating said network connection;
   restarting said application with a blocked second network socket owned by said application;
   conforming a state of said blocked second network socket to a current network connection state associated with said first network socket; and
   unblocking said blocked second network socket and allowing said second network socket to take over from said first network socket as said endpoint of said network connection to said network peer on behalf of said application, said take over including discontinuing said maintaining of said first network socket as said network connection endpoint.

2. A method in accordance with claim 1 wherein said application is disposed in a virtual application environment and said application is quiesced as part of an application migration operation wherein said virtual application environment is migrated from a source machine to a target machine.

3. A method in accordance with claim 2 wherein said first network socket is maintained by a connection manager that resides on said target machine.

4. A method in accordance with claim 2 wherein said first network socket is maintained by a source connection manager residing on said source machine or an intermediary machine, and wherein said method further includes establishing a target network connection manager on said target machine and using said target connection manager to conform said state of said blocked second network socket to said current network connection state of said first network socket maintained by said source connection manager.

5. A method in accordance with claim 4 wherein said virtual application environment includes an operating system, and wherein said source connection manager is distributed between a first source connection manager part residing in said virtual application environment on said source machine and a second source connection manager part residing outside said virtual application environment, and further wherein said target connection manager resides in said virtual application environment on said target machine.

6. A method in accordance with claim 1 wherein said network connection is sustained by a transport layer of said network protocol stack associated with said first network socket.

7. A method in accordance with claim 1 wherein said current network connection state comprises one or more of 4-tuple source and destination addresses, port numbers, TCP flags, Selective ACKnowledgement (SACK) options data, an Initial Send Sequence number (ISS), current sequence and acknowledgement numbers, and a current state of a receive buffer and transmitted but unacknowledged data.

8. A system for implementing network connection failover during application service interruption, comprising:
   a source machine;
   a target machine;
   an application to be migrated from said source machine to said target machine;
   a first network socket owned by said application when running on said source machine, said first network socket representing an endpoint of a network connection to a network peer on behalf of said application when running on said source machine;
   socket maintaining logic adapted to maintain said first network socket after said application is quiesced for migration from said source machine to said target machine platform;
   network connection sustaining logic adapted to sustain said network connection whose endpoint is represented by said first network socket in order to keep said network connection alive at said first network socket until a second network socket takes over from said first network socket, said network connection being sustained by controlling said first network socket so that its associated network protocol stack provides acknowledgements of incoming network traffic to said network peer that prevent said network peer from terminating said network connection;

a second network socket owned by said application when running on said target machine, said second network socket representing an endpoint of said network connection to said network peer on behalf of said application when running on said target machine, said second network socket having a blocked state and an unblocked state;

connection state conforming logic adapted to conform a network connection state of said second network socket when in said blocked state to a current network connection state of said first network socket; and unblocking logic adapted to unblock said blocked second network socket from said blocked state to said unblocked state and allow said second network socket to take over from said first network socket as said endpoint of said network connection to said network peer on behalf of said application, said take over including discontinuing said maintaining of said first network network socket as said network connection endpoint.

9. A system in accordance with claim 8 wherein said application is disposed in a virtual application environment when running on said source and target machines and wherein said system further includes migration management logic adapted to quiesce said application on said source machine as part of an application migration operation wherein said virtual application environment is migrated from said source machine to said target machine.

10. A system in accordance with claim 9 wherein said socket maintaining logic comprises a target connection manager residing on said target machine.

11. A system in accordance with claim 9 wherein said socket maintaining logic comprises a source connection manager residing on said source machine or an intermediary machine, and wherein said system further includes a target network connection manager on said target machine, said target connection manager comprising said connection state conforming logic.

12. A system in accordance with claim 11 wherein said virtual application environment includes an operating system, and wherein said source connection manager is distributed between a first source connection manager part residing in said virtual application environment on said source machine and a second source connection manager part residing outside said virtual application environment, and further wherein said target connection manager resides in said virtual application environment on said target machine.

13. A system in accordance with claim 8 wherein said network connection sustaining logic sustains said network connection using a transport layer of said network protocol stack associated with said first network socket.

14. A system in accordance with claim 8 wherein said current network connection state information used by said network state conforming logic comprises one or more of 4-tuple source and destination addresses, port numbers, TCP flags, Selective ACKnowledgement (SACK) options data, an Initial Send Sequence number (ISS), current sequence and acknowledgement numbers, and a current state of a receive buffer and transmitted but unacknowledged data.

15. A computer program product, comprising:
one or more non-transitory data storage media;
programming logic stored on said data storage media for programming a hardware platform to implement network connection failover during application service interruption, said network connection failover comprising:

quiescing a running application while maintaining a first network socket owned by said application, said first network socket representing an endpoint of a network connection to a network peer on behalf of said application;

sustaining said network connection whose endpoint is represented by said first network socket in order to keep said network connection alive at said source network socket until a second network socket takes over from said first network socket, said network connection being sustained by controlling said first network socket so that its associated network protocol stack provides acknowledgements of incoming network traffic to said network peer that prevent said network peer from terminating said network connection;

restarting said application with a blocked second network socket owned by said application;

conforming a state of said blocked second network socket to a current network connection state associated with said first network socket; and unblocking said blocked second network socket and allowing said second network socket to take over from said first network socket as said endpoint of said network connection to said network peer on behalf of said application, said take over including discontinuing said maintaining of said first network socket as said network connection endpoint.

16. A computer program product in accordance with claim 15 wherein said application is disposed in a virtual application environment and said application is quiesced as part of an application migration operation wherein said virtual application environment is migrated from a source machine to a target machine.

17. A computer program product in accordance with claim 16 wherein said first network socket is maintained by a connection manager that resides on said target machine.

18. A computer program product in accordance with claim 16 wherein said first network socket is maintained by a source connection manager residing on said source machine or an intermediary machine programmed by said computer program product, and wherein said computer program product further includes programming logic recorded on said data storage media for establishing a target network connection manager on said target machine to conform said state of said blocked second network socket to said current network connection state of said first network socket maintained by said source connection manager.

19. A computer program product in accordance with claim 18 wherein said virtual application environment includes an operating system, and wherein said source connection manager is distributed between a first source connection manager part residing in said virtual application environment on said source machine and a second source connection manager part residing outside said virtual application environment, and further wherein said target connection manager resides in said virtual application environment on said target machine.

20. A computer program product in accordance with claim 15 wherein said network connection is sustained by a transport layer of said network protocol stack associated with said first network socket.

21. A computer program product in accordance with claim 15 wherein said current network connection state comprises one or more of 4-tuple source and destination addresses, port numbers, TCP flags, Selective ACKnowledgement (SACK) options data, an Initial Send Sequence number (ISS), current sequence and acknowledgement numbers, and a current state of a receive buffer and transmitted but unacknowledged data.

22. A method for implementing network connection failover during application service interruption, comprising:
quiescing a running application while maintaining a first network socket that represents an endpoint of a network connection to a network peer on behalf of said application;
transferring control of said first network socket and network connection state information associated with said first network socket to a connection manager, such that said first network socket becomes a connection manager socket;
sustaining said network connection whose endpoint is represented by said first network socket in order to keep said network connection alive at said first network socket until a second network socket takes over from said first network socket, said network connection being sustained by controlling said first network socket so that its associated network protocol stack provides acknowledgements of incoming network traffic to said network peer that prevent said network peer from terminating said connection;
restarting said application with a blocked second network socket owned by said application;
conforming a state of said blocked second network socket to a current network connection state maintained by said connection manager; and
unblocking said blocked second network socket and allowing said second network socket to take over from said first network socket as said endpoint of said network connection to said network peer on behalf of said application, said take over including discontinuing said maintaining of said first network socket as said network connection endpoint.

23. A method in accordance with claim 22, wherein said connection manager is distributed between a source machine and a target machine used for migration of said application.

24. A computer program product, comprising:
one or more non-transitory data storage media;
programming logic stored on said data storage media for programming a hardware platform to implement a migration manager for migrating a running application while implementing network connection failover during said migration, said network connection failover comprising:
quiescing a running application while maintaining a first network socket that represents an endpoint of a network connection to a network peer on behalf of said application;
transferring control of said first network socket and network connection state information associated with said first network socket to a connection manager, such that said first network socket becomes a connection manager socket;
sustaining said network connection whose endpoint is represented by said first network socket in order to keep said network connection alive at said first network socket until a second network socket takes over from said first network socket, said network connection being sustained by controlling said first network socket so that its associated network protocol stack provides acknowledgements of incoming network traffic to said network peer that prevent said network peer from terminating said connection;
restarting said application with a blocked second network socket owned by said application;
conforming a state of said blocked second network socket to a current network connection state maintained by said connection manager; and
unblocking said blocked second network socket and allowing said second network socket to take over from said first network socket as said endpoint of said network connection to said network peer on behalf of said application, said take over including discontinuing said maintaining of said first network socket as said network connection endpoint.

25. A computer program product in accordance with claim 24, wherein said connection manager is distributed between a source machine and a target machine used for migration of said application.

* * * * *